(12) United States Patent
Martinez et al.

(10) Patent No.: US 9,977,240 B2
(45) Date of Patent: May 22, 2018

(54) SYSTEM FOR DISPLAYING AN IMAGE ON A WINDSHIELD

(71) Applicant: Commissariat à l'Energie Atomique et aux Energies Alternatives, Paris (FR)

(72) Inventors: Christophe Martinez, Grenoble (FR); Umberto Rossini, Coublevie (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days. days.

(21) Appl. No.: 15/302,968

(22) PCT Filed: Apr. 9, 2015

(86) PCT No.: PCT/FR2015/050956
§ 371 (c)(1),
(2) Date: Oct. 7, 2016

(87) PCT Pub. No.: WO2015/158999
PCT Pub. Date: Oct. 22, 2015

(65) Prior Publication Data
US 2017/0038585 A1    Feb. 9, 2017

(30) Foreign Application Priority Data
Apr. 16, 2014  (FR) ..................... 14 53404

(51) Int. Cl.
*G03B 21/62*    (2014.01)
*G02B 27/01*    (2006.01)
(Continued)

(52) U.S. Cl.
CPC .......... *G02B 27/0101* (2013.01); *B60R 1/001* (2013.01); *G02B 5/0284* (2013.01);
(Continued)

(58) Field of Classification Search
CPC ........... G02B 27/01; G02B 5/02; F03B 21/62; B60R 1/00; B60R 1/12; G03B 21/62
See application file for complete search history.

(56) References Cited

U.S. PATENT DOCUMENTS 5,940,212 A    8/1999    Johnson
8,465,639 B2    6/2013    Lu
(Continued)

FOREIGN PATENT DOCUMENTS

EP    0935769 A1    8/1999
JP    2005055822 A    3/2005
(Continued)

OTHER PUBLICATIONS

PCT International Search Report; International Application No. PCT/FR2015/050956; dated Jun. 18, 2015, 3 pages.
(Continued)

*Primary Examiner* — Sultan Chowdhury
*Assistant Examiner* — Daniel L Owens
(74) *Attorney, Agent, or Firm* — Moreno IP Law LLC

(57) ABSTRACT

The invention relates to a screen comprising transparent portions and retroreflective portions distributed over all or part of the surface thereof.

13 Claims, 5 Drawing Sheets

(51) Int. Cl.
  *B60R 1/00* (2006.01)
  *G02B 5/02* (2006.01)
  *G02B 5/124* (2006.01)
  *B60R 1/12* (2006.01)

(52) U.S. Cl.
  CPC ......... *G02B 5/124* (2013.01); *G02B 27/0172* (2013.01); *G03B 21/62* (2013.01); *B60R 2001/1215* (2013.01); *G02B 2027/0196* (2013.01)

(56) References Cited

U.S. PATENT DOCUMENTS

| | | |
|---|---|---|
| 2001/0047846 A1 | 12/2001 | Currens |
| 2002/0126378 A1* | 9/2002 | Cho ....................... G03B 21/56 359/443 |
| 2002/0163722 A1 | 11/2002 | Gehring et al. |
| 2004/0160681 A1 | 8/2004 | Sekiguchi |
| 2005/0185279 A1* | 8/2005 | Mullen .................. G02B 5/124 359/530 |
| 2010/0195201 A1 | 8/2010 | Minoura et al. |
| 2013/0083291 A1* | 4/2013 | Smithwick ............. G03B 21/60 353/7 |
| 2013/0342813 A1* | 12/2013 | Wang ..................... G02B 5/124 353/7 |

FOREIGN PATENT DOCUMENTS

| | | | |
|---|---|---|---|
| NO | 2013069589 A1 | 5/2013 | |
| WO | WO 2013069589 A1 * | 5/2013 | ........... G03B 21/602 |

OTHER PUBLICATIONS

European Search Report for European Application No. EP17151187, dated May 18, 2017, 2 pages.

* cited by examiner

SYSTEM FOR DISPLAYING AN IMAGE ON A WINDSHIELD

BACKGROUND

The present application relates to a system for displaying an image on a transparent windshield of a vehicle (for example, of a motor vehicle), and to a screen adapted to such a system, which screen may further have applications in other fields.

DISCUSSION OF THE RELATED ART

Systems where an image is projected on a transparent diffusing film pasted on the windshield inside of the vehicle have already been provided, and enable to supply an occupier of the vehicle with information overlaid on the outer scene visible through the windshield.

FIG. 1 is a cross-section view schematically showing an example of a system 100 for displaying an image on a transparent windshield 102. System 100 comprises a transparent diffusing film 104 coating the inner surface of the windshield, that is, its surface facing the inside of the vehicle. System 100 further comprises a projector 106 located inside of the vehicle and arranged to project an image onto all or part of the surface of film 104 facing the inside of the vehicle (that is, opposite to windshield 102).

Film 104 is a reflective diffuser film capable of reflecting, by more or less strongly diffusing it, the light from projector 106, without or only slightly altering the light coming from the outside of the vehicle.

Unless diffuser film or display 104 is perfectly Lambertian, that is, capable of reflecting the light with a constant luminance in all directions, the diffusion cone of the light reflected on the surface of film 104, or angular energy distribution diagram of the diffused radiation, is centered on a direction different from the direction of the incident radiation, forming an angle r with the normal at the point of incidence equal to the specular reflection angle, that is, to angle i between the normal at the point of incidence and the incident ray.

Given the generally limited space of vehicle passenger compartments and the arrangement of the windshield with respect to user 108, the specular reflection angle is generally distant from main axis X of the user's line of sight. Thus, in most cases, display 104 has to have a wide diffusion cone 110 (shown in dotted lines in FIG. 1), close to the Lambertian case. As a result, the light energy projected on display 104 by projector 106 is scattered all across the angular space, only a small fraction of this energy being captured by the observer's pupils.

Thus, a disadvantage of display systems of the type described in relation with FIG. 1 is that they have a relatively low light efficiency, which may be a problem in certain situations, and particularly in case of a strong outside luminosity.

It would be desirable to have a windshield image display system which overcomes all or part of the disadvantages of known systems.

It would further be desirable to have a screen adapted to such a system and further, more generally, capable of having applications in other fields, this screen overcoming all or part of the disadvantages of known screens.

SUMMARY

Thus, an embodiment provides a screen comprising transparent portions and retroreflective portions distributed across all or part of its surface, where the rate of screening by the retroreflective portions is smaller than or equal to 50%.

According to an embodiment, each retroreflective portion is separated from neighboring retroreflective portions by at least one transparent portion.

According to an embodiment, the screen comprises a plurality of juxtaposed elementary regions, each comprising a retroreflective portion surrounded with a transparent portion.

According to an embodiment, the rate of screening by the retroreflective portions is smaller than or equal to 20%.

According to an embodiment, the screen comprises a plate of a transparent material having a first surface which is structured at the level of the retroreflective portions of the screen and smooth at the level of the transparent portions of the screen, and having a smooth second surface opposite to the first surface.

According to an embodiment, the structures of the first surface at the level of the retroreflective portions of the screen form cube corner protrusions.

According to an embodiment, each retroreflective portion of the screen comprises a single cube corner protrusion.

According to an embodiment, each retroreflective portion of the screen comprises a plurality of adjacent cube corner protrusions.

According to an embodiment, the screen comprises a plate of a transparent material having a first surface coated with a layer of a retroreflective material based on microbeads at the level of the retroreflective portions of the screen and which is not coated with said layer at the level of the transparent portions of the screen.

According to an embodiment, the screen comprises: a first element made of a transparent material having at least one first surface comprising cube corner recesses at the level of the retroreflective portions of the screen, separated by smooth areas corresponding to the transparent portions of the screen, the walls of the recesses being coated with a metal layer; and a second element made of a transparent material comprising a first planar surface pasted to the first surface of the first element via a transparent glue layer.

According to an embodiment, the retroreflective portions further comprise diffusing elements.

Another embodiment provides an assembly comprising a vehicle windshield and a screen of the above-mentioned type at least partially coating a surface of the windshield.

Another embodiment provides a system for displaying an image on a windshield, comprising: a screen of the above-mentioned type at least partially coating a surface of the windshield; and a projector capable of projecting an image on the screen.

According to an embodiment, the projector is capable of being assembled on a user's head.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION OF THE PRESENT EMBODIMENTS

Figure 1:
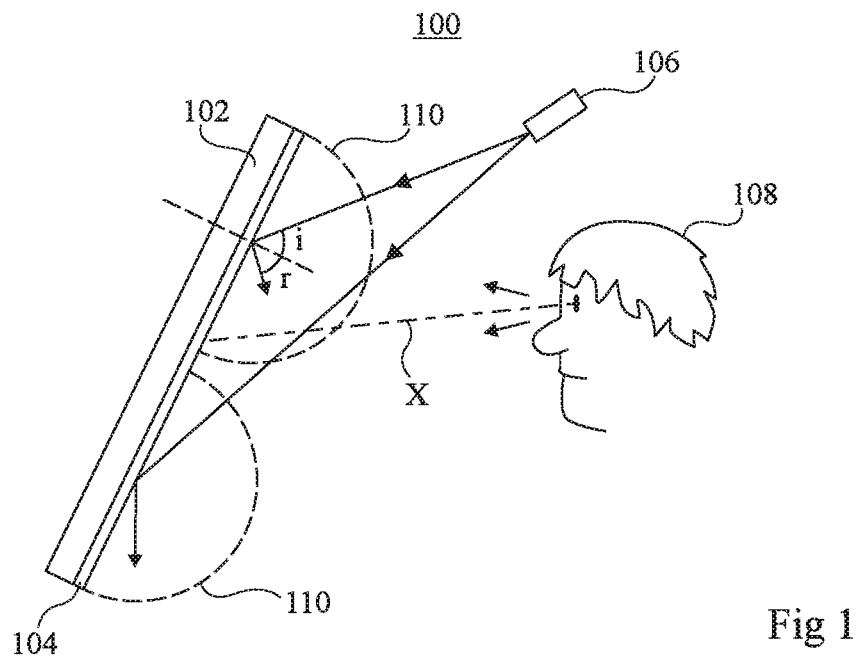
FIG. 1, previously described, is a cross-section view schematically showing an example of a windshield image display system.

For clarity, the same elements have been designated with the same reference numerals in the various drawings and, further, the various drawings are not to scale. Further, in the following description, unless otherwise indicated, terms "approximately", "substantially", "about", "almost", and "in the order of" mean "to within 10%" or, when angular values or the like are concerned, "to within 10 degrees". Further, in the present application, unless otherwise indicated, term transparent is used to qualify elements, materials, films, assemblies, etc. letting through, with no significant alteration, the light of the visible spectrum or of almost the entire visible spectrum. Further, unless otherwise indicated, term smooth refers to a so-called "optical polish" surface quality, enabling optical beams to be transmitted or reflected by the surface with no significant modification of their propagation characteristics. Thus, a smooth transparent surface enables to view an image through the surface with no significant deformation. In the meaning of the present application, a smooth surface has a surface roughness smaller than 20 nm RMS ("Root Mean Square", corresponding to the square root of the average of the amplitude of the surface roughnesses), and preferably in the range from 2 to 15 nm RMS.

Figure 2:
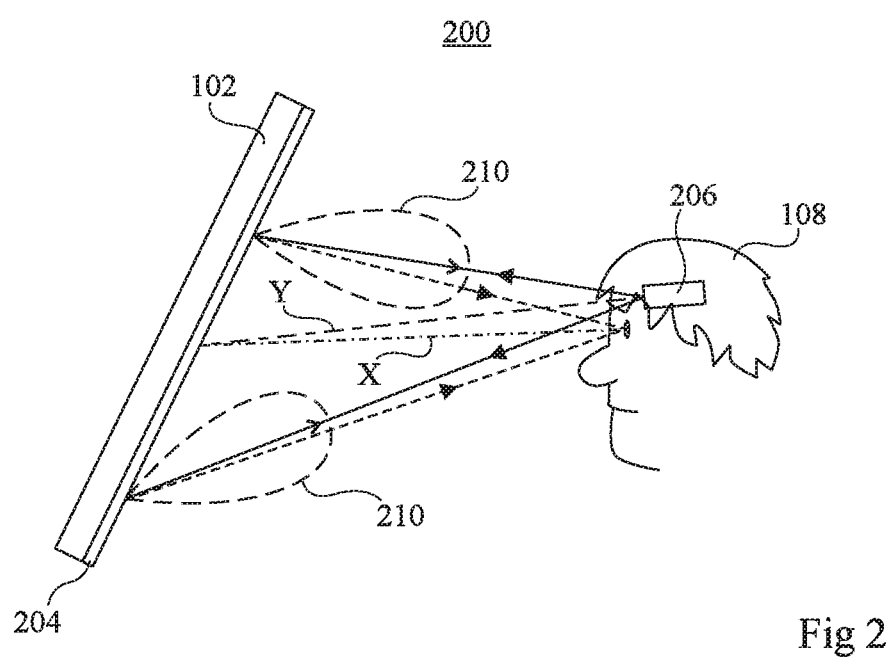
FIG. 2 is a cross-section view schematically showing an embodiment of a windshield image display system.

FIG. 2 is a cross-section view schematically showing an embodiment of a system 200 for displaying an image on a transparent windshield 102.

System 200 comprises a screen 204, coating all or part of the inner surface of windshield 102, that is, the surface thereof facing the inside of the vehicle. System 200 further comprises a projector 206 capable of being mounted on the head of a user 108, for example, the vehicle driver. Projector 206 is preferably mounted on the user's head in the vicinity of the ocular area so that main projection axis Y is close to main axis X of the user's line of sight, for example, so that axes X and Y form an angle smaller than or equal to 20 degrees. As a non-limiting example, the light exit area or emission area of projector 206 is located less than 20 cm, and preferably less than 10 cm, away from the user's pupils. Projector 206 is capable of projecting an image on all or part of the surface of display 206 facing the inside of the vehicle (that is, opposite to windshield 102).

According to an aspect of the described embodiments, screen 204 is a partially transparent and partially retroreflective screen. In other words, screen 204 is capable of retroreflecting—that is, of reflecting towards its source—light coming from projector 206, and of giving way with no significant alteration to light coming from windshield 102, that is, from the outside of the vehicle. Screen 204 thus has a transparency function, enabling the user to see the outer scene through windshield 102 from the inside of the vehicle, and a retroreflection function, enabling the user—whose pupils are close to projector 206—to see, overlaid on the outer scene, an image generated by projector 206. Since light source 206 cannot be placed exactly along the user's line of sight (unless a reflection element such as a beam splitter is placed in front of the user's eye, which would be relatively bulky and might disturb the user), screen 204 should preferably be capable of diffusing the retroreflected light in a diffusion cone 210 containing the user's pupil, so that the user can see the image displayed by the projector. Diffusion cone 210 may however have a relatively small angular aperture, for example within a range from 5 to 30 degrees, due to the proximity between projector 206 and the user's eyes. Anyhow, the angular aperture of the diffusion cone may be much smaller than in a system with a reflective diffuser screen of the type described in relation with FIG. 1.

Thus, an advantage of the system of FIG. 2 is that it has a light efficiency greater than that of the system of FIG. 1.

Various alternative embodiments, not shown, of the system of FIG. 2 may be provided, and may possibly be combined.

As an example, system 200 may comprise a camera, for example, but not necessarily, mounted on the user's head, capable of acquiring a representation of the outer scene close to that perceived by the user. The provision of a camera may in particular enable to implement augmented reality functionalities.

If a camera is mounted on the user's head, an application starting system based on the recognition, in the images acquired by the camera, of pictograms formed on peripheral regions of screen 204, for example, by printing, etching, or by any other adapted method, may optionally be provided. For example, a pictogram may correspond to a specific projection application, which may be started when the user displaces his/her head so that the pictogram enters the field of vision of the camera or passes through a specific position of the field of view of the camera. The closing of the application may be controlled when the pictogram comes out of the field of view of the camera, or enters a second time the field of view of the camera, or passes a second time through a specific position of the field of view of the camera. An advantage is that the user can thus start and/or close applications only by motions of his/her head, without having to use his/her hands.

Further, the system of FIG. 2 may comprise two different projectors respectively located in the vicinity of the user's two eyes. As a non-limiting example, a first projector may be located less than 10 cm away, and preferably less than 5 cm away, from a first pupil of the user, and a second projector may be located less than 10 cm away, and preferably less than 5 cm away, from the user's second pupil. The diffusion cone of the light retroreflected by screen 204 may be selected to only encompass one of the user's two eyes. An advantage is that different images can thus be projected via the two projectors, which may enable to improve the viewing comfort.

As a non-limiting example, the projector(s) of the system of FIG. 2 may be micromirror projectors of DMD type ("Digital Micromirror Device"). Each projector may for example comprise: a light source comprising one or a plurality of light-emitting diodes and one of a plurality of optical element for shaping the emitted light; and a DMD-type image generation device; and one or a plurality of optical elements for shaping the image beam. To minimize the bulk at the level of the user's head, the light source may be offset from the image generation device, the light generated by the source being transmitted to the image generation device via one or a plurality of light guides, for example, optical fibers. An advantage is that the bulk and/or weight constraints bearing on the light source can be decreased.

Embodiments of screen 204 of the system of FIG. 2 will be described hereafter.

Figure 3:
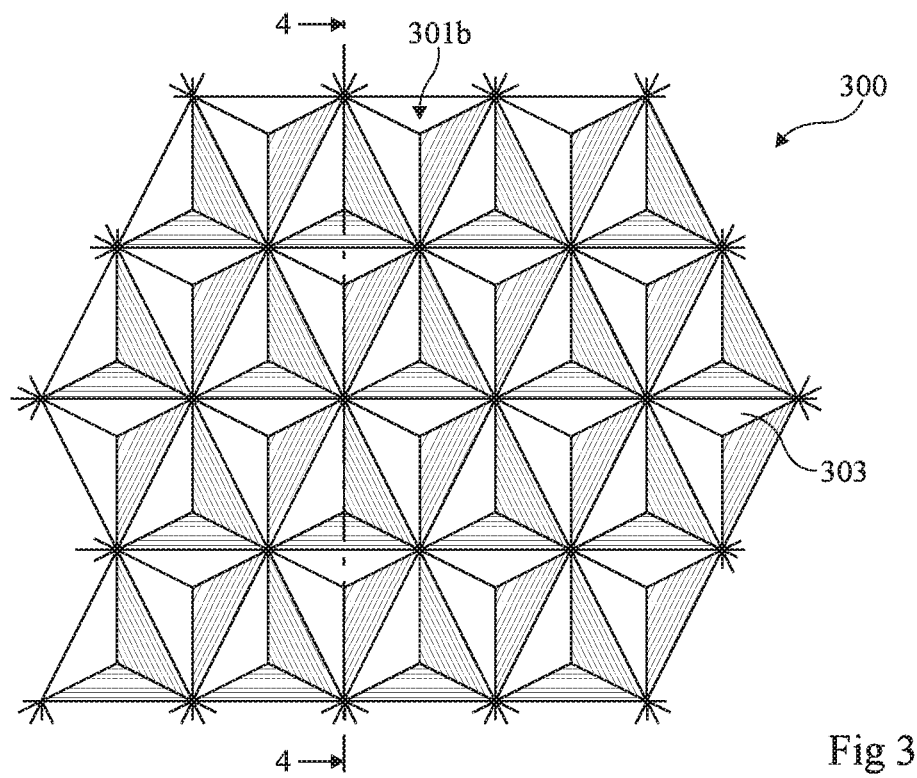
FIGS. 3 and 4 are respective top and cross-section views schematically and partially showing an example of a retroreflective screen.
Figure 4:
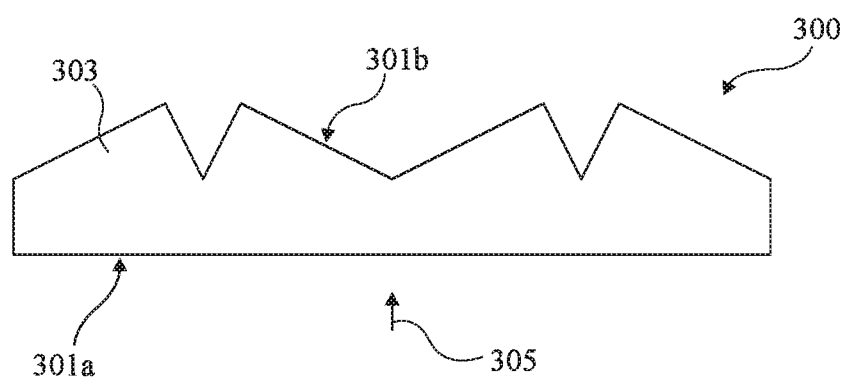

FIGS. 3 and 4 are respective top and cross-section views schematically and partially showing an example of a conventional retroreflective screen. FIG. 4 is a cross-section view of display 300 along plane 4-4 of FIG. 3.

In this example, display 300 is formed by a plate, a sheet, or a film made of a transparent material, for example, glass or plastic, having an approximately smooth surface 301a and having a structured surface 301b opposite to surface 301a, exhibiting substantially identical protrusions 303. Each protrusion 303 substantially has the shape of a cube corner, that is, of a trihedron comprising three triangular lateral surfaces joining at a same point, or vertex corner, and opposite to the vertex corner, a triangular base, for example in the shape of an equilateral triangle. The bases of protrusions 303 are approximately parallel to smooth surface 301a of the screen, and protrusions 303 are substantially adjacent and substantially cover the entire surface of the screen. The dimensions of protrusions 303 depend on the targeted application. As an example, the base of each protrusion may be an equilateral triangle, having a side length from 100 μm to 1 mm.

Screen 100 is intended to be illuminated through its smooth surface 301a, as schematically illustrated by arrow 305 of FIG. 4. When an incident light beam (not shown) reaches screen 300, the beam crosses a portion of the screen thickness until it reaches the base of one of cube corners 303, penetrates into this cube corner, and is then reflected on each of the three lateral surfaces of the cube corner and, after being reflected on the third lateral surface, returns towards the source.

In the shown example, the reflections on the lateral surfaces of the cube corners are based on the principle of total internal reflection. As a variation, the lateral surfaces of the cube corners may be covered with a reflective material such as aluminum on the side of surface 301b of the screen. The reflections on the lateral surfaces of the cube corners then are mirror-type reflections.

Screen 300 of FIGS. 3 and 4 is not transparent, and in particular, it does not enable a user placed on the side of surface 301a of the screen to view through the screen a scene located on the side of surface 301b of the screen. Indeed, even when surface 301b of the screen is not coated with a reflective material, the structures of surface 301b give display 300 a depolished aspect, depriving it of the natural transparency of the material forming it. Such a screen is thus not adapted to a screen system of the type described in relation with FIG. 2.

According to an aspect of the described embodiments, a screen 204 comprising transparent portions and retroreflective portions regularly distributed across all or part of its surface is provided. Each retroreflective portion is for example separated from neighboring retroreflective portions by at least one transparent portion. As an example, screen 204 comprises, in front view, a plurality of juxtaposed substantially identical elementary regions, substantially covering the entire surface of the screen, each elementary region comprising a retroreflective portion and a transparent portion. As an example, in each elementary region, the transparent portion surrounds the reflective portion (in front view). The dimensions of the retroreflective portions and the spacing between the retroreflective portions are selected to be able to view a scene in transparency through screen 204. The retroreflective portions for example enable to add information to the image of the real scene seen through the screen in a screen system of the type described in relation with FIG. 2. As an example, the dimensions of the retroreflective portions are such that, in front view, the retroreflective surface area of the screen is smaller than or equal to 50% and preferably smaller than or equal to 20% of the total surface area of the screen, the remaining surface being transparent. The described embodiments are however not limited to this specific case.

FIGS. 5A to 5D are cross-section views schematically and partially showing steps of an example of a method of manufacturing a first embodiment of screen 204.

Figure 5A:
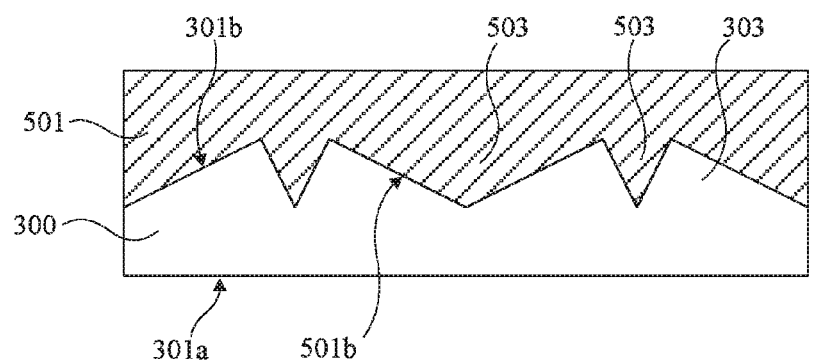
FIGS. 5A to 5D are cross-section views schematically and partially showing steps of a method of manufacturing a first embodiment of a screen.

FIG. 5A illustrates an initial step during which it is started from a structure 300 having the shape of a conventional non-transparent retroreflective screen having a surface 301b exhibiting protrusions 303 in the shape of cube corners coating all or substantially all the surface of the screen, for example, a screen of the type described in relation with FIGS. 3 and 4. Structure 300 is for example a catadioptric screen made of glass or of plastic, or a metal mould having the shape of a catadioptric screen. Structure 300 may be obtained by any known method of manufacturing a retroreflective display with cube corners, for example, a method of the type described in U.S. Pat. No. 8,465,639. As illustrated in FIG. 5A, a mold 501 of structured surface 301b of structure 300 is formed, for example, by pressing or liquid deposition of an adapted material on surface 301b of structure 300. As a non-limiting example, mold 501 is made of nickel—obtained, for example, by electroplating—or of plastic material (for example, of polymethyl methacrylate type)—obtained, for example, by hot molding. Mold 501 preferably has a thickness greater than the height of protrusions 303. After a possible hardening phase, mold 501 is separated from structure 300. A surface 501b of mold 501 then comprises the impression of surface 301b of structure 300, that is, it comprises protrusions 503 having a shape complementary to that of protrusions 303 of structure 300.

Figure 5B:
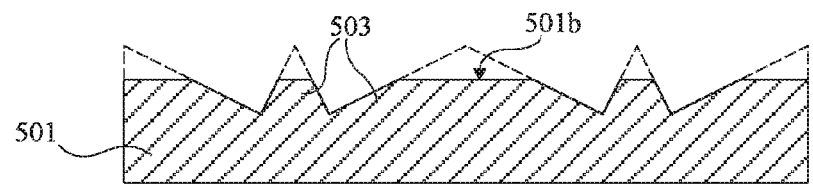

FIG. 5B illustrates a step during which structured surface 501b of mold 501 is partially polished or evened, that is, a portion of the material of the mold is removed from the side of surface 501b, across a thickness smaller than the height of protrusions 503. At the end of this step, protrusions 503, initially pointed, have top plateaus located in a same plane approximately parallel to a base plane of protrusions 503.

Figure 5C:
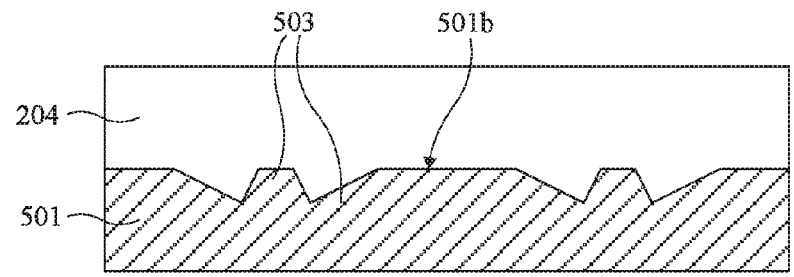

FIG. 5C illustrates a step subsequent to the polishing step of FIG. 5B, during which a screen 204 is formed from mold 501. Screen 204 is for example formed by pressing or deposition in liquid form of a transparent material, for example, plastic or glass, on surface 501b of the mold. Screen 204 preferably has a thickness greater than the height of protrusions 503 of the mold. After a possible hardening phase, screen 204 is separated from mold 501.

Figure 5D:
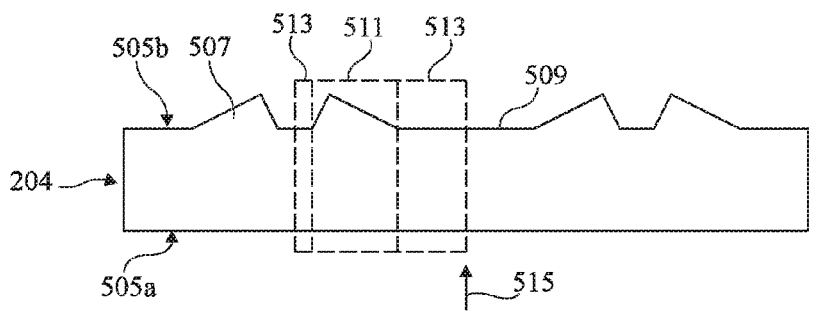

FIG. 5D is a cross-section view illustrating screen 204 obtained at the output of mold 501. As appears in FIG. 5D, in this example, screen 204 is formed of a plate, sheet, or film made of a transparent material having an approximately smooth surface 505a, and having a surface 505b opposite to surface 505a having substantially identical protrusions 507 regularly distributed across the entire screen surface. Each protrusion 507 has a cube corner shape, the bases of protrusions 507 being, in this example, approximately parallel to smooth surface 505a of the screen. As schematically illustrated by an arrow 515 in FIG. 5D, screen 204 is intended to be illuminated through its surface 505a. A difference between screen 204 of FIG. 5D and structure 300 of FIGS. 3 and 4 is that, in screen 204 of FIG. 5D, protrusions 507 are not adjacent but are separated from one another by substantially smooth areas 509 of surface 505b, parallel or approximately parallel to surface 505a of the screen, corresponding to the top plateaus of protrusions 503 of mold 501.

In this example, each display portion opposite a protrusion 507 of surface 505b corresponds to a non-transparent retroreflective portion of screen 204, and the screen portions located opposite smooth areas 509 of surface 505b correspond to transparent portions of screen 204. Thus, in front view, screen 204 of FIG. 5D comprises a plurality of substantially identical juxtaposed elementary regions, substantially coating the entire display surface, each elementary region comprising a central retroreflective portion 511 corresponding to a single protrusion 507, and a peripheral transparent portion 513 surrounding retroreflective portion 511, corresponding to a portion of smooth area 509 of surface 505b. As an example, in each elementary region, in front view, the ratio of the surface area occupied by protrusion 507 to the total surface area of the elementary region, or screening rate, is smaller than or equal to 50% and preferably smaller than or equal to 20%. According to the targeted application, the screening rate may however take other values.

As indicated hereabove, for a use in a screen system of the type described in relation with FIG. 2, screen 204 should not only have transparency properties and retroreflective properties, but should further be capable of diffusing the retroreflective light to enable the user to perceive part of this light. It has further been indicated hereabove that the diffusion cone of the retroreflected light may have a relatively small angular aperture due to the proximity between the light source (projector 206) and the user's pupils.

In the example of FIG. 5D, screen 204 comprises no element specifically capable of implementing a diffusion function. Indeed, the inventors have observed that diffraction effects on the edges of protrusions 507 and/or unavoidable surface imperfections of the screen may, in certain applications, be sufficient to obtain the required diffusion effect.

In certain cases, it may however be desirable for the screen to have elements specifically capable of implementing a diffusion function.

Figure 6:
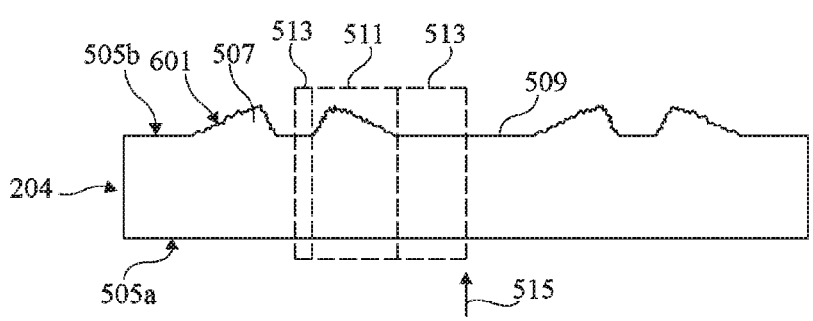
FIG. 6 is a cross-section view schematically and partially showing an alternative embodiment of the screen described in relation with FIGS. 5A to 5D.
Figure 7:
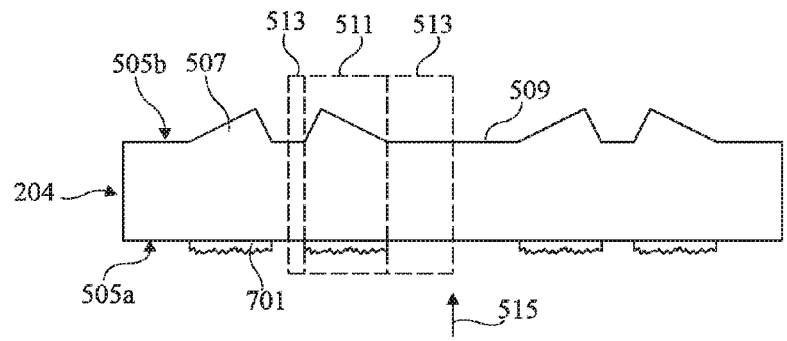
FIG. 7 is a cross-section view schematically and partially showing another alternative embodiment of the screen described in relation with FIGS. 5A to 5D.

FIGS. 6 and 7 are cross-section views schematically and partially showing two alternative embodiments of screen 204 of FIG. 5D, where the screen comprises elements specifically capable of implementing a diffusion function.

In the example of FIG. 6, screen 204 has a structure similar to what has been described in relation with FIGS. 5A to 5D, and differs from the display of FIG. 5D in that the lateral surfaces of protrusions 507 exhibit micro- or nano-structures 601 capable of diffusing the light retroreflected by the protrusions. Preferably, structures 601 of surface 505b are only formed on protrusions 507, that is, in retroreflective portions 511 of the screen, and not on smooth areas 509 of surface 505b, that is, in transparent portions 513 of the screen, to avoid altering the transparency of portions 513 of the screen. As an example, structures 601 may be formed by combining the manufacturing method described in relation with FIGS. 5A to 5D with a method of the type described in U.S. Pat. No. 6,258,443, aiming at a retroreflective surface with textured facets.

In the example of FIG. 7, screen 204 has a structure similar to what has been described in relation with FIGS. 5A to 5D, and differs from the screen of FIG. 5D in that it comprises, on the side of its surface 505a, opposite or facing each protrusion 507, a diffusing element 701. Preferably, diffusing elements 701 are located only in front of retroreflective protrusions 507, that is, in retroreflective portions 511 of the screen, and do not extend in front of smooth areas 509 of surface 505b, that is, in transparent portions 513 of the screen, to avoid altering the transparency of portions 513. As an example, diffusing elements 701 may be formed by depositing a material filled with diffusing particles on surface 505a of the screen, for example, by silk displaying, or by lithography of areas of controlled roughness on surface 505a, or by molding—for example at the same time as protrusions 507.

As a variation, to obtain the desired diffusing effect, screen 204 may be made of a transparent material filled with diffusing particles. For the diffusing effect to be preponderating at the level of protrusions 507 and relatively low or negligible at the level of areas 509 of the screen, areas 509 relatively thin as compared with protrusions 507 will then be formed, for example, areas 509 having a thickness smaller than or equal to one tenth of the height of protrusions 507.

Figure 8:
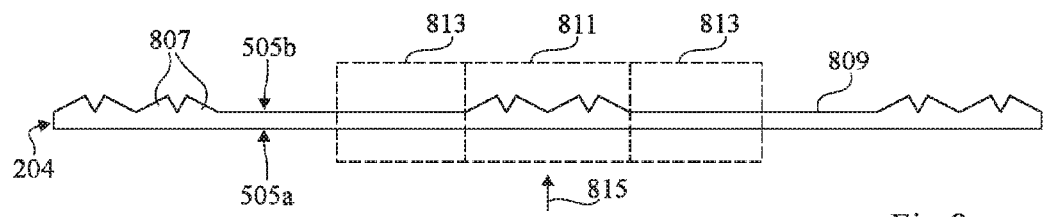
FIG. 8 is a cross-section view schematically and partially showing a second embodiment of a screen.

FIG. 8 is a cross-section view schematically and partially showing a second embodiment of screen 204.

In this example, screen 204 comprises a plate, sheet, or film made of a transparent material, for example, glass or plastic, having an approximately smooth surface 505a and having a surface 505b opposite to surface 505a comprising structured areas having substantially identical protrusions 807 in the shape of cube corners, corresponding to retroreflective areas of the screen, and substantially smooth areas 809, parallel or approximately parallel to surface 505a, corresponding to transparent areas of the screen. As in the example of FIG. 5D, screen 204 comprises, in front view, substantially identical juxtaposed elementary areas, extending substantially across the entire surface of the screen, each elementary region comprising a non-transparent retroreflective central portion 811, and a transparent peripheral portion 813 surrounding retroreflective portion 811. Screen 204 of FIG. 8 differs from the screen of FIG. 5D in that, in the screen of FIG. 8, in each elementary region, central retroreflective portion 811 comprises a plurality of juxtaposed cube corner protrusions 807 rather than a single one. In each elementary region, transparent portion 813 corresponds to a portion of smooth area 809 of surface 505b. In each elementary region, the rate of screening by the retroreflective portion is for example smaller than or equal to 50% and preferably smaller than or equal to 20%. As schematically illustrated by an arrow 815 in FIG. 8, screen 204 is intended to be illuminated through its surface 505a.

The alternative embodiments of FIGS. 5 and 6 may be adapted to the embodiment of FIG. 8, that is, the screen of FIG. 8 may further comprise additional diffusing elements at the level of retroreflective portions 811, either on the side of surface 505b, in the shape of structures on the lateral surfaces of protrusions 807, or on the side of surface 505a.

Figure 9:
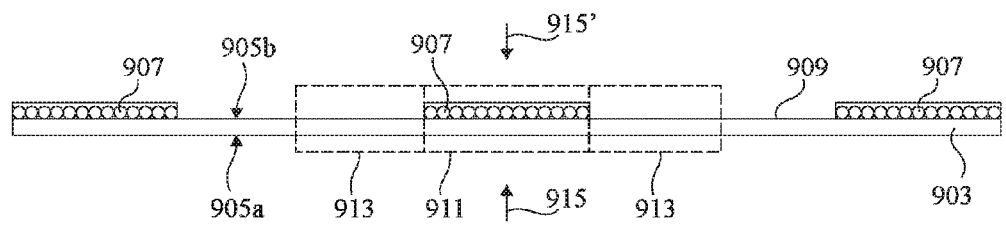
FIG. 9 is a cross-section view schematically and partially showing a third embodiment of a screen.

FIG. 9 is a cross-section view schematically and partially showing a third embodiment of screen 204.

In this example, screen 204 comprises a transparent plate, sheet, or film 903, for example, made of glass or of plastic, having a surface 905b comprising areas coated with a layer 907 of a retroreflective material based on microbeads, and areas 909 which are not coated with layer 907. The screen areas where plate 903 is coated with layer 907 correspond to retroreflective areas of the screen, and the screen areas where plate 903 is not coated with plate 907 correspond to transparent areas of the screen. As an example, in front view, screen 204 of FIG. 9 comprises, as in the examples of FIGS. 5D and 8, substantially identical juxtaposed elementary regions substantially arranged all across the screen surface, each elementary region comprising a non-transparent retroreflective central portion 911, corresponding to a screen portion where plate 903 is coated with layer 907, and a transparent peripheral portion 913 surrounding retroreflective portion 911, corresponding to a screen portion where plate 913 is not coated with layer 907. As a non-limiting example, in each elementary region, in front view, the ratio of the surface area occupied by retroreflective layer 907 to the total surface area of the elementary region, or rate of screening of the screen by the retroreflective portions, is smaller than or equal to 50% and preferably smaller than or equal to 20%. As schematically illustrated by arrows 915 and 915' in FIG. 9, screen 204 may be illuminated either on the side of surface 905b of transparent plate 903, or on the side of its surface 905a opposite to its surface 905b, the microbeads of layer 907 being retroreflective for all illumination directions. As a variation, elements specifically capable of implementing a function of diffusion of the retroreflected light may be added to screen 204 of FIG. 8, for example, elements of the type described in relation with FIG. 7.

FIGS. 10A to 10D are cross-section views schematically and partially showing steps of an example of a method of manufacturing a fourth embodiment of screen 204.

Figure 10A:
FIGS. 10A to 10D are cross-section views schematically and partially showing steps of a method of manufacturing a fourth embodiment of a screen.

FIG. 10A illustrates a first element 1001 of screen 204. Screen element 1001 of FIG. 10A is made of a transparent material and has similarities with screen 204 of FIG. 5D. In particular, screen element 1001 comprises a planar surface and a structured surface, the structured surface comprising cube corner structures, corresponding to the retroreflective portions of the screen, separated by areas substantially parallel to the planar surface of screen element 1001, corresponding to the transparent portions of the screen. Screen element 1001 of FIG. 10A differs from screen 204 of FIG. 5D essentially in that, in screen element 1001, the cube corner structures are not protruding but hollow or recessed with respect to the areas of the structured surface of screen element 1001 parallel to the planar surface of screen element 1001.

As an example, a mold, for example, metallic, having the shape of screen 204 of FIG. 5D, is formed, for example, by electroplating from mold 501 of FIG. 5B, the mold being then used to form screen element 1001.

Figure 10B:
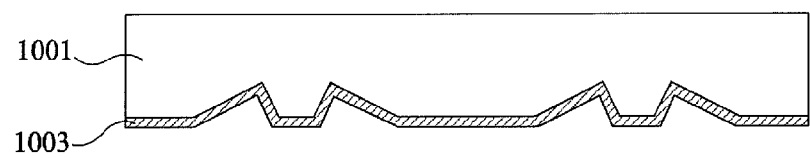

FIG. 10B illustrates a step during which a reflective metal layer 1003 is deposited, preferably conformally, on the structured surface of screen element 1001, to extend both in the cube-corner recesses, that is, on the lateral surfaces thereof, and on the planar areas surrounding the recesses. The thickness of metal layer 1003 is smaller than the depth of the cube corner recesses. As an example, the depth of the cube corner recesses is in the range from 60 to 100 nm, and the thickness of metal layer 1003 is in the range from 30 to 60 nm. Metal layer 1003 is for example a silver or aluminum layer.

Figure 10C:
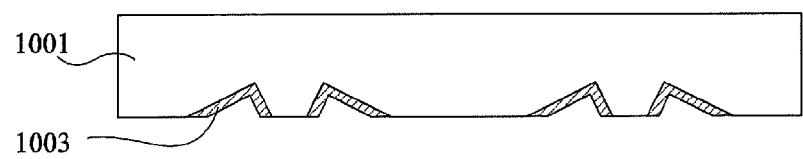

FIG. 10C illustrates a step during which the portions of metal layer 1003 coating the planar areas surrounding the recesses of screen element 1001 are removed, for example, by polishing. Thus, metal layer 1003 only remains present in the recesses of screen element 1001, more specifically on the lateral surfaces thereof.

Figure 10D:
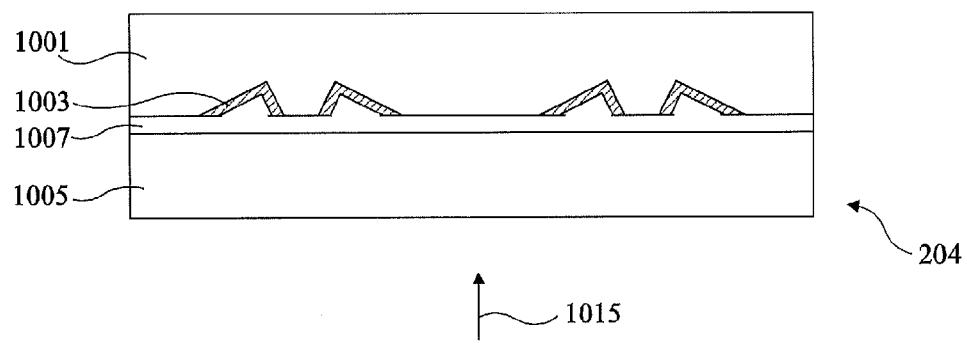

FIG. 10D illustrates a step during which a second screen element 1005 is assembled to the first screen element 1001, on the side of the structured surface of first screen element 1001. Second screen element 1005 may be a film, a plate, or a transparent sheet, the two surfaces of which are preferably smooth and planar. Screen elements 1001 and 1005 are for example assembled by means of a transparent glue layer 1007. Glue layer 1007 preferably entirely fills the cube corner recesses of screen element 1001. As an example, screen elements 1001 and 1005 and transparent glue 1007 have substantially the same optical index. As an example, optical glues having an index in the order of 1.5 are available for sale, for example, the glue known under trade name Polytec UV 2137. Such glues are well adapted to glass or polymethyl methacrylate, which may be used to form screen elements 1001 and 1005.

As illustrated in FIG. 10D, screen 204 is formed by the assembly of screen elements 1001 and 1003, metal layer 1003 coating the cube corner structures and transparent glue layer 1007.

As schematically illustrated by an arrow 1015 in FIG. 10D, screen 204 is intended to be illuminated through the surface of screen element 1005 opposite to screen element 1001.

A display screen having its cube corner structures protected from the environment by their being located inside of the screen, and having an angular retroreflection efficiency improved by the presence of metallization 1003 coating the lateral surfaces of the cube corner recesses, is thus obtained. Further, the cleaning of the screen is eased by the fact that its two outer surfaces are substantially smooth.

As in the example of FIG. 7, diffusing elements (not shown in FIG. 10D) may be arranged on the surface of screen element 1005 opposite to display element 1001, facing the cube corner structures of the screen. Preferably, the diffusing elements are arranged only opposite the cube corner structures, and not opposite the planar areas of the structured surface of element 1001, to avoid altering the transparency of the transparent portions of the screen.

Specific embodiments have been described. Various alterations, modifications, and improvements will readily occur to those skilled in the art.

In particular, the described embodiments are not limited to the examples shown in the drawings where screen 204 has an approximately planar general shape. It will be within the abilities of those skilled in the art to adapt the described examples to curved screens, particularly for the projection of images on curved windshields.

Further, the embodiments described in relation with FIGS. 5A to 5D, 6, 7, and 8 are not limited to the case where the reflections on the cube corner protrusions of the retroreflective display portions are of total internal reflection type. As a variation, the lateral surfaces of the cube corners may be coated with a reflective material such as aluminum or silver.

Further, the described embodiments are not limited to the above-described examples of arrangement, sizing, and distribution on the screen surface of the retroreflective portions and of the transparent portions of the screen. According to the targeted application, it will be within the abilities of those skilled in the art to provide other arrangements of the retroreflective portions.

Further, although the described embodiments of a partially transparent and partially reflective display described hereabove are advantageous in a system for displaying an image on a windshield of the type described in relation with FIG. 2, the provided screens may have other applications. As a non-limiting example, such screens may be used for various augmented reality applications for which the transparency of the projection area is required. Scenography spaces in museums may in particular be provided, where images are projected on showcases behind which real works are displayed. As a variation, such screens may be used, rather than as a projection screen, as a protection screen aiming at deterring visitors from taking flash photographs of certain sensitive works. Indeed, in many museums, signs forbidding flash photography are not sufficient to deter visitors from taking such photographs, which may result in degrading the works. Installing a partially transparent and partially retroreflective screen in front of the works would result in inevitably botched flash photographs, without for all this preventing visitors from seeing the works. Visitors would thus be deterred from taking flash photographs.

What is claimed is:

1. A screen comprising a first element made of a transparent material, the first element having:
    a first surface and a smooth second surface opposite the first surface; and
    the first surface comprising cube corner shaped recesses formed therein and extending into the transparent material toward the second surface, each of the cube corner shaped recesses being separated by smooth areas, walls of the recesses being coated with a reflective metal layer and the smooth areas not being coated with the reflective metal layer,
    wherein the cube corner shaped recesses define retroreflective portions of the screen and the smooth areas define transparent portion of the screen, the transparent portions and retroreflective portions being distributed across all or part of the first surface of the screen, and the rate of screening by the retroreflective portions being smaller than or equal to 50%.

2. The screen of claim 1, wherein each retroreflective portion is separated from neighboring retroreflective portions by at least one transparent portion.

3. The screen of claim 1, comprising a plurality of juxtaposed elementary regions, each comprising a retroreflective portion surrounded with a transparent portion.

4. The screen of claim 1, wherein the retroreflective portions further comprise diffusing elements.

5. The screen of claim 4, wherein the diffusing elements are arranged on the side of the first surface of the first element.

6. The screen of claim 4, wherein the diffusing element are located only in front of the retroreflective portions.

7. An assembly comprising a vehicle windshield and the screen of claim 1 at least partially coating a surface of the windshield.

8. A system for displaying an image on a windshield, comprising:
    the screen of claim 1 at least partially coating a surface of the windshield; and
    a projector capable of projecting an image on said screen.

9. The system of claim 8, wherein the projector is capable of being mounted on the head of a user.

10. The screen of claim 1, further comprising:
    a second element made of a transparent material, the second element comprising a first planar surface pasted to the first surface of the first element via a transparent glue layer.

11. The screen of claim 10, wherein the glue layer entirely fills the cube corner shaped recesses of the first surface of the first element.

12. The screen of claim 10, wherein the first and second element and the glue layer have substantially the same optical index.

13. The screen of claim 10, wherein the diffusing elements are arranged on the side of the second element opposite to the first element.

* * * * *